US009008932B2

(12) United States Patent
Minami (10) Patent No.: US 9,008,932 B2
(45) Date of Patent: Apr. 14, 2015

(54) VEHICLE WITH CRUISE CONTROL DEVICE

(71) Applicant: Yamaha Hatsudoki Kabushiki Kaisha, Iwata-shi, Shizuoka (JP)

(72) Inventor: Kengo Minami, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 120 days.

(21) Appl. No.: 13/688,269

(22) Filed: Nov. 29, 2012

(65) Prior Publication Data

US 2014/0046563 A1 Feb. 13, 2014

(30) Foreign Application Priority Data

Aug. 10, 2012 (JP) ................................ 2012-178445

(51) Int. Cl.
| | |
|---|---|
| *B60W 10/02* | (2006.01) |
| *B60W 10/06* | (2006.01) |
| *F16D 48/06* | (2006.01) |
| *B60K 31/04* | (2006.01) |
| *B60W 30/14* | (2006.01) |
| *B60W 10/11* | (2012.01) |
| *B60W 10/184* | (2012.01) |
| *B60W 30/18* | (2012.01) |

(52) U.S. Cl.
CPC ................. *F16D 48/06* (2013.01); *B60K 31/04* (2013.01); *B60W 10/02* (2013.01); *B60W 10/06* (2013.01); *B60W 10/11* (2013.01); *B60W 10/184* (2013.01); *B60W 30/143* (2013.01); *B60W 2030/1809* (2013.01); *B60W 2510/0225* (2013.01); *B60W 2510/0638* (2013.01); *B60W 2510/0676* (2013.01); *B60W 2510/1005* (2013.01); *B60W 2520/10* (2013.01); *B60W 2720/10* (2013.01); *B60Y 2200/12* (2013.01)

(58) Field of Classification Search
None
See application file for complete search history.

(56) References Cited

U.S. PATENT DOCUMENTS 5,685,801 A * 11/1997 Benford et al. ................ 477/108
6,988,028 B2 * 1/2006 Iriyama ............................ 701/93

FOREIGN PATENT DOCUMENTS

JP        07-008622 B2     2/1995

* cited by examiner

*Primary Examiner* — John R Olszewski
*Assistant Examiner* — Todd Melton
(74) *Attorney, Agent, or Firm* — Keating & Bennett, LLP (57) ABSTRACT

A vehicle includes a cruise control section arranged and programmed to perform control to maintain the vehicle speed at a prescribed vehicle speed while a clutch is engaged. A clutch actuator control section performs control to disengage the clutch when the value of a parameter becomes equal to or lower than a first threshold value, in the case where the cruise control section is determined to not be performing the control to maintain the vehicle speed at a prescribed vehicle speed; and performs the control to disengage the clutch when the value of the parameter becomes equal to or lower than a second threshold value, which is lower than the first threshold value, in the case where the cruise control section is determined to be performing the control to maintain the vehicle speed at a prescribed vehicle speed.

7 Claims, 8 Drawing Sheets

VEHICLE WITH CRUISE CONTROL DEVICE

BACKGROUND OF THE INVENTION

1. Field of the Invention

The present invention relates to a vehicle including a control device that automatically controls a vehicle speed.

The present application claims priority from Japanese Patent Application No. 2012-178445, filed on Aug. 10, 2012, which is incorporated by reference herein in its entirety.

2. Description of the Related Art

Conventionally, as described in, for example, JP H07-008622, a vehicle including a speed control device for performing control to automatically maintain the speed of the vehicle at a prescribed speed selected by a rider (hereinafter, such control will be referred to as "cruise control") without a rider operating an accelerator operator is known. The speed control device described in JP H07-008622 is structured to cancel the cruise control when the clutch is disengaged while the cruise control is performed.

Also conventionally, a vehicle including an automatic clutch which is automatically engaged or disengaged without being operated by a rider is known. Known automatic clutches include, for example, a clutch which is engaged or disengaged by an actuator such as an electric motor or the like.

The inventor of the present application discovered that, in a vehicle including both the speed control device that cancels the cruise control when the clutch is disengaged and an automatic clutch that is disengaged and engaged in accordance with the rotation speed of the engine, there is a case where the cruise control is canceled against the intention of the rider while the cruise control is performed.

SUMMARY OF THE INVENTION

Preferred embodiments of the present invention provide a vehicle which prevents the control to maintain a vehicle speed at a prescribed speed (i.e., the "cruise control") from being cancelled against the intention of the rider while the cruise control is performed.

Figure 8:
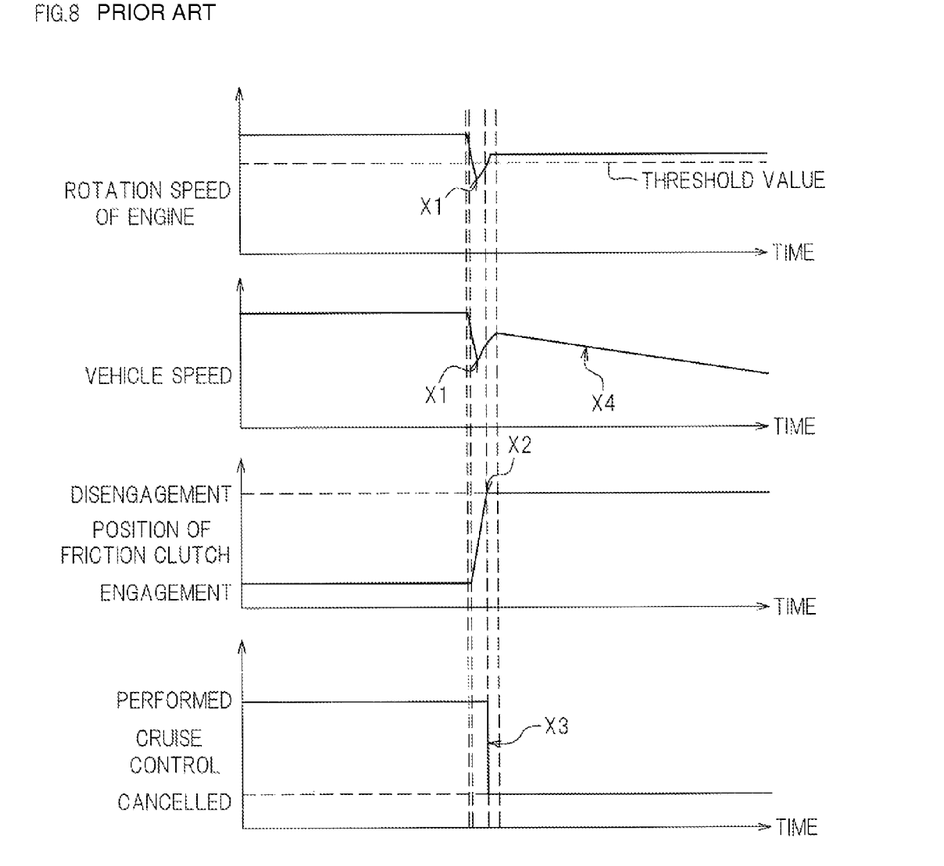
FIG. 8 is a timing diagram regarding cruise control of a conventional vehicle.

FIG. 8 is an example of a timing diagram of a vehicle including a speed control device arranged to cancel the cruise control when the clutch is disengaged and an automatic clutch disengaged or engaged in accordance with the rotation speed of the engine, in the case where the cruise control is cancelled against the intention of the rider. The inventor of the present application discovered that, as shown in this example, there is a case where, while the cruise control is performed by the speed control device, the rotation speed of the engine or the vehicle speed (hereinafter, referred to as the "rotation speed of the engine, etc.") is temporarily decreased (see arrows X1 in FIG. 8) by an external factor such as, for example, the vehicle going over a step or a bump. The automatic clutch is disengaged or engaged in accordance with the rotation speed of the engine. Thus, when the rotation speed of the engine becomes lower than a prescribed value (hereinafter, referred to as the "threshold value"), the automatic clutch is disengaged (see arrow X2 in FIG. 8). Then, the cruise control is cancelled (see arrow X3 in FIG. 8) in association with the disengagement of the clutch. As a result, the vehicle speed is decreased (see arrow X4 in FIG. 8). For this reason, there occurs a problem that although the rider has an intention of running the vehicle at a prescribed speed, the cruise control is cancelled against the intention of the rider.

In order to prevent the cruise control from being cancelled against the intention of the rider, it is conceivable to decrease the threshold value. However, when the threshold value is merely decreased, the clutch is not disengaged until the rotation speed of the engine becomes equal to or lower than the threshold value. In this case, engine stall may occur. However, the cruise control has a characteristic of automatically increasing the rotation speed of the engine, etc. after the rotation speed of the engine, etc. is decreased. Therefore, while the cruise control is performed, a decrease of the threshold value does not cause any practical problem.

Preferred embodiments of the present invention have been developed based on the above-described discoveries.

A vehicle according to a preferred embodiment of the present invention includes an engine; a driving wheel drivable by the engine; a clutch located between the engine and the driving wheel; a clutch actuator arranged to disengage and engage the clutch; an engine rotation speed sensor arranged to detect a rotation speed of the engine; a vehicle speed detection sensor arranged to detect a vehicle speed; a clutch actuator control device arranged and programmed to control the clutch actuator; a cruise control device arranged and programmed to perform control to maintain the vehicle speed at a prescribed vehicle speed by controlling an output of the engine while the clutch is engaged, and to cancel the control to maintain the vehicle speed at a prescribed vehicle speed when the clutch is disengaged; and a determination device arranged to determine whether the cruise control device is performing the control to maintain the vehicle speed at a prescribed vehicle speed. When the cruise control device is determined to not be performing the control to maintain the vehicle speed at a prescribed vehicle speed, the clutch actuator control device performs control to disengage the clutch when a value of a parameter, which is either the rotation speed of the engine or the vehicle speed, becomes equal to or lower than a first threshold value; and when the cruise control device is determined to be performing the control to maintain the vehicle speed at a prescribed vehicle speed, the clutch actuator control device performs the control to disengage the clutch when the value of the parameter the becomes equal to or lower than a second threshold value, which is lower than the first threshold value.

With the vehicle according to preferred embodiments of the present invention, while the control to maintain the vehicle speed at a prescribed vehicle (i.e., "cruise control") is not performed by the cruise control device, when the value of the parameter, which is either the rotation speed of the engine or the vehicle speed, is decreased to a value equal to or lower than the first threshold value, the clutch actuator control device performs the control to disengage the clutch, so that the comfort of riding is not spoiled or affected. As a result, the comfort of riding can be guaranteed. By contrast, while the cruise control device performs the cruise control, when the value of the parameter, which is either the rotation speed of the engine or the vehicle speed, is decreased to a value equal to or lower than the second threshold value, which is lower than the first threshold value, the clutch actuator control device performs the control to disengage the clutch. As a result, while the cruise control is performed, the clutch is more unlikely to be disengaged. Therefore, the cruise control can be prevented from being cancelled against the intention of the rider. This is especially effective for the case where the rotation speed of the engine or the vehicle speed is decreased merely temporarily as a result of an external factor such as, for example, the vehicle going over a step or a bump. When the rotation speed of the engine or the vehicle speed is decreased as a result of an external factor such as such as, for example, the vehicle going over a step or a bump, the decrease is temporary and thus the comfort for the rider is not spoiled at all. In addition, the cruise control returns the vehicle speed, if being decreased, to the prescribed vehicle speed automatically. Therefore, engine stall is unlikely to occur. If the threshold value is decreased uniformly regardless of whether the cruise control device is performing the cruise control or not, the following occurs. While the cruise control is not performed, the clutch is not disengaged until the rotation speed of the engine or the vehicle speed is decreased significantly. This causes a problem that the comfort of riding is spoiled. However, according to preferred embodiments of the present invention, such a problem is avoided and reliably prevented. As described above, the vehicle according to preferred embodiments of the present invention prevents the cruise control from being cancelled against the intention of the rider while the cruise control is performed and also guarantees the comfort of riding.

According to a preferred embodiment of the present invention, the vehicle further includes a transmission mechanism including a plurality of transmission gear positions. Preferably, the parameter is the vehicle speed and the first threshold value and the second threshold value are each set for each of the plurality of transmission gear positions, for example.

In this manner, the vehicle speed used to disengage the clutch can be set for each of the transmission gear positions. Therefore, as compared with the case the where the first threshold value and the second threshold value of the vehicle speed are set uniformly for all the gear positions, the vehicle speed used to disengage the clutch can be set to a lower value depending on the transmission gear position.

According to a preferred embodiment of the present invention, the vehicle further includes a shift actuator arranged to drive the transmission mechanism.

As a result, even when the vehicle speed is temporarily decreased by an external factor such as, for example, the vehicle going over a step or a bump, the gear position is automatically changed to return the vehicle speed to the prescribed vehicle speed swiftly.

According to a preferred embodiment of the present invention, the parameter preferably is the rotation speed of the engine; and the first threshold value is preferably set to an idle rotation speed when the engine is in an idling state.

As a result, the comfort of riding can be guaranteed.

According to a preferred embodiment of the present invention, the idle rotation speed preferably encompasses a first idle rotation speed when the engine has a temperature equal to or higher than a prescribed temperature and a second idle rotation speed when the engine has a temperature lower than the prescribed temperature; the second idle rotation speed is higher than the first idle rotation speed; and the first threshold value is set to the second idle rotation speed.

When the temperature of the engine is lower than a prescribed temperature, the engine, when being in an idling state, is driven at the second idle rotation speed, which is relatively high. Therefore, the engine can be warmed up quickly. In the meantime, the first threshold value is set to a higher value, and thus the problem that the cruise control is cancelled against the intention of the rider is more likely to occur. For this reason, the above-described effect is exerted more effectively.

According to a preferred embodiment of the present invention, the vehicle preferably further includes a braking device arranged to apply a braking power to the driving wheel. When the braking device gives a braking power to the driving wheel while the cruise control device performs the control to maintain the vehicle speed at a prescribed vehicle speed, the cruise control device cancels the control to maintain the vehicle speed at a prescribed vehicle speed.

As a result, the rider can easily cancel the control to maintain the vehicle speed at a prescribed vehicle speed by actuating the braking device.

According to a preferred embodiment of the present invention, the vehicle is a motorcycle.

According to a preferred embodiment of the present invention, a motorcycle providing the above-described functions and effects can be provided.

As described above, various preferred embodiments of the present invention provide a vehicle that prevents the control to maintain the vehicle speed at a prescribed speed from being cancelled against the intention of the rider while the control is performed.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
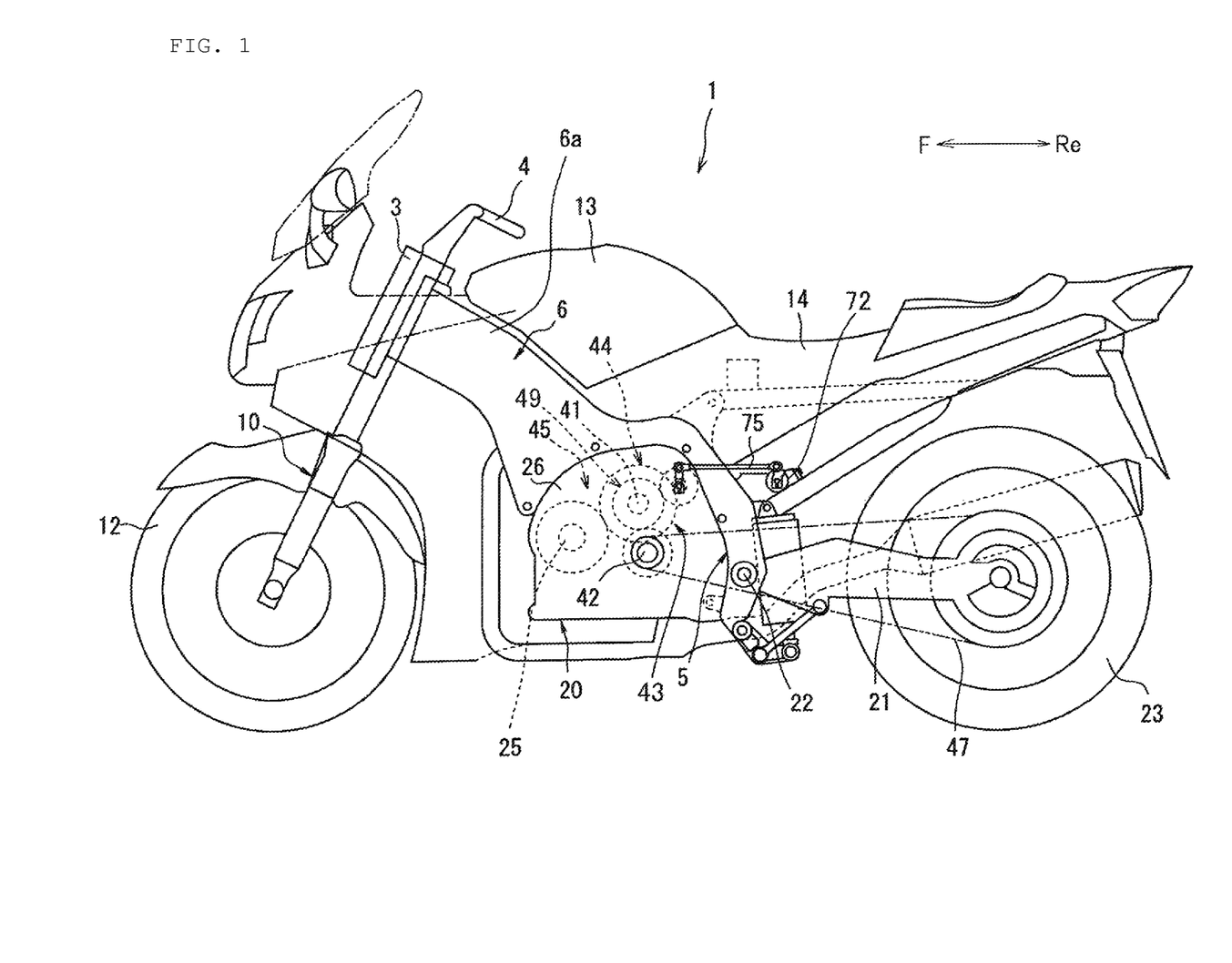
FIG. 1 is a side view of a motorcycle according to a preferred embodiment of the present invention.

Hereinafter, preferred embodiments of the present invention will be described. As shown in FIG. 1, a vehicle according to a preferred embodiment of the present invention preferably is a motorcycle 1, for example. The motorcycle 1 is not limited to any specific type and may be of, for example, a so-called scooter type, a moped type, an off-road type, an on-road type or the like. A vehicle according to the present invention is not limited to a motorcycle, and may be a saddle type vehicle which a rider (user) rides astride or an equivalent thereof. Saddle type vehicles include, for example, an ATV (All Terrain Vehicle), a four-wheel buggy or the like in addition to a motorcycle. In FIG. 1, reference characters F and Re respectively represent "front" and "rear".

As shown in FIG. 1, the motorcycle 1 preferably includes a head pipe 3 and a body frame 6. The body frame 6 preferably includes two, i.e., left and right, frames 6a extending rearward from the head pipe 3. FIG. 1 shows only one frame 6a. A rear portion of the frame 6a extends downward. The rear portion of the frame 6a is connected to a rear arm bracket 5. The rear arm bracket 5 is connected to a front end portion of a rear arm 21 via a pivot shaft 22. The rear arm 21 is swingable upward and downward about the pivot shaft 22. At a rear end portion of the rear arm 21, a rear wheel 23 is supported. The rear wheel 23 is a driving wheel drivable by an engine 45, described later. The motorcycle 1 preferably includes a vehicle speed detection sensor 94 (see FIG. 5). The vehicle speed detection sensor 94 is arranged to detect a vehicle speed of the motorcycle 1. Based on the detected vehicle speed, the vehicle speed detection sensor 94 outputs a vehicle speed signal to an ECU (Electronic Control Unit) 100. There is no specific limitation on the position at which the vehicle speed detection sensor 94 is attached.

A fuel tank 13 is preferably located above the frame 6a. A seat 14 on which the rider may sit is preferably located rearward of the fuel tank 13.

Figure 2:
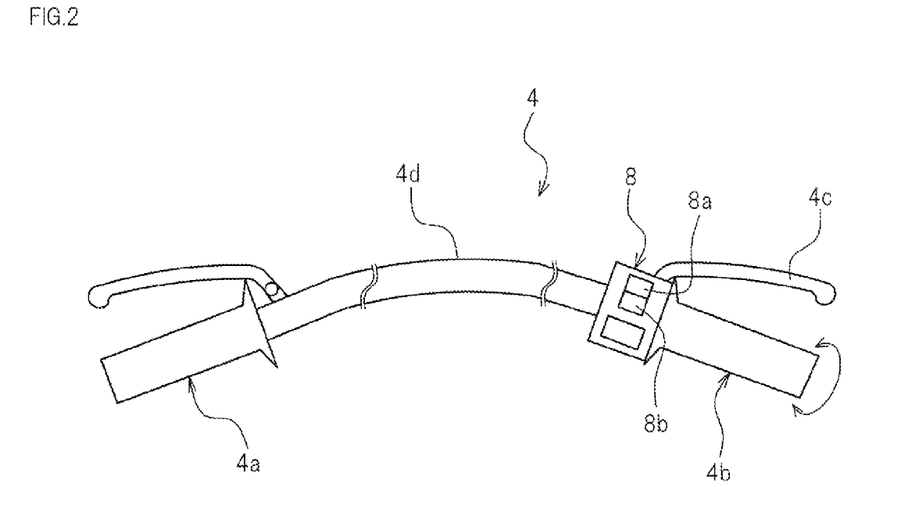
FIG. 2 is a structural view of a handle according to a preferred embodiment of the present invention.

The head pipe 3 is arranged to support a steering shaft (not shown), and a handle 4 is provided on the steering shaft. As shown in FIG. 2, the handle 4 is preferably provided with a shift switch 8. The shift switch 8 preferably includes a shift-up switch 8a and a shift-down switch 8b, and can be used to increase or decrease a transmission gear 49, described later, in the range from a neutral position to a maximum position (e.g., a sixth gear) by a manual operation. The shift switch 8 outputs a gear change instruction to a shift actuator control section 140 (see FIG. 5), described later.

As shown in FIG. 2, the handle 4 includes a handle bar 4d connected to the steering shaft. The handle 4 preferably includes a left grip 4a located at a left end portion of the handle bar 4d and a right grip 4b located at a right end portion of the handle bar 4d. The right grip 4b is rotatable with respect to the handle bar 4d. In the vicinity of the right grip 4b, a brake lever 4c is located. In this preferred embodiment, an operation of the brake lever 4c actuates a front brake 18 (see FIG. 5) to apply a braking power to a front wheel 12 described later. In a lower right portion of the motorcycle 1, a brake pedal (not shown) is provided. An operation of the brake pedal actuates a rear brake 19 (see FIG. 5) to apply a braking power to the rear wheel 23. The motorcycle 1 may be structured such that an operation of the brake pedal actuates the front brake 18. Alternatively, the motorcycle 1 may be structured such that an operation of the brake lever 4c actuates the rear brake 19.

At a lower portion of the steering shaft, a front fork 10 is provided. At a lower end of the front fork 10, the front wheel 12 is rotatably supported. The front wheel 12 is a subordinate wheel rotating in accordance with the running of the motorcycle 1.

Figure 4:
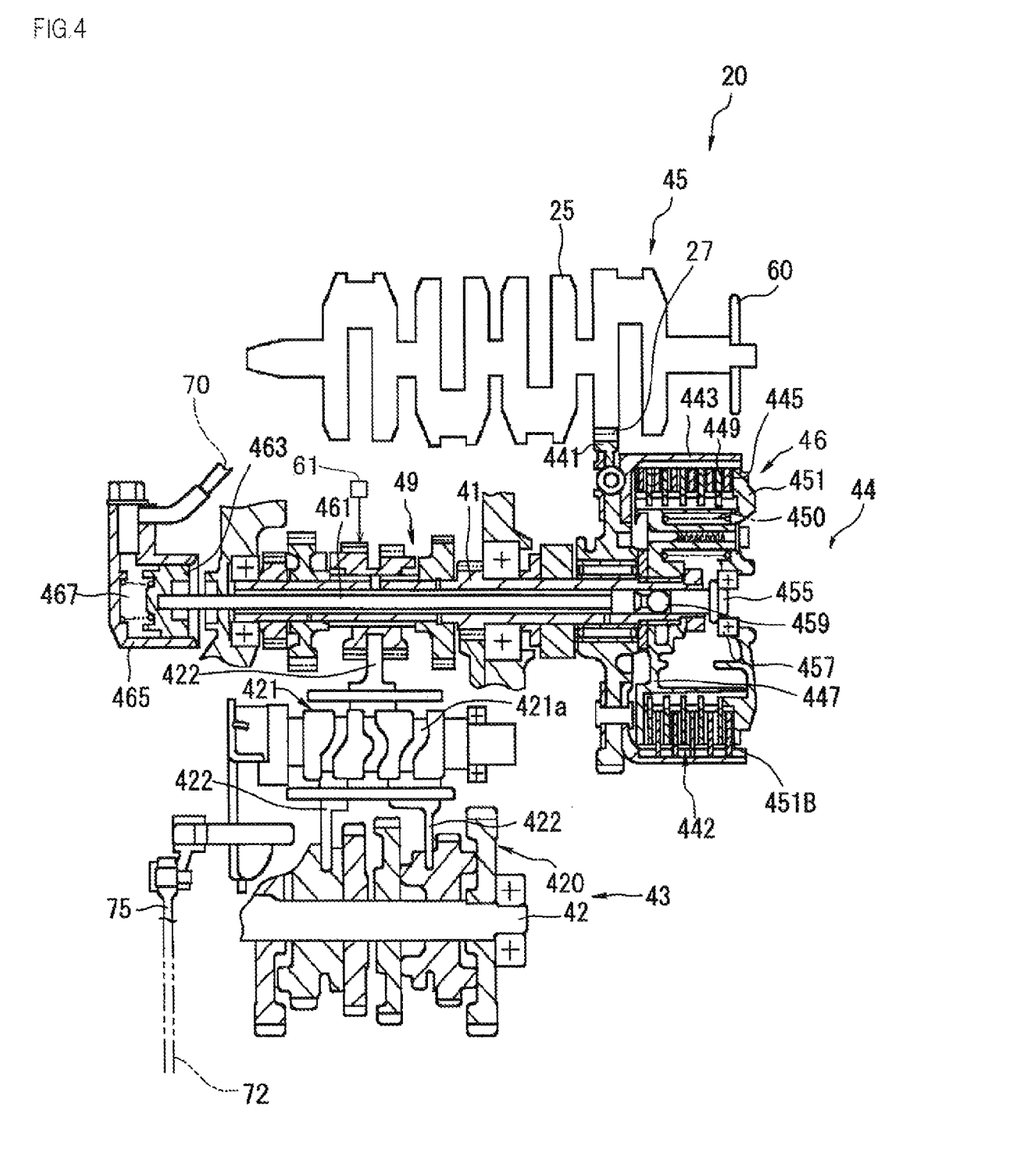
FIG. 4 is cross-sectional view showing an internal structure of a power unit according to a preferred embodiment of the present invention.

A power unit 20 is preferably suspended from the frame 6a and the rear arm bracket 5. FIG. 4 is a cross-sectional view showing an internal structure of the power unit 20. As shown in FIG. 4, the power unit 20 preferably includes at least the engine 45, an automatic clutch 44, and a transmission mechanism 43. The engine 45, the automatic clutch 44, and the transmission mechanism 43 are preferably integrally assembled with a crankcase 26 (see FIG. 1).

Figure 3:
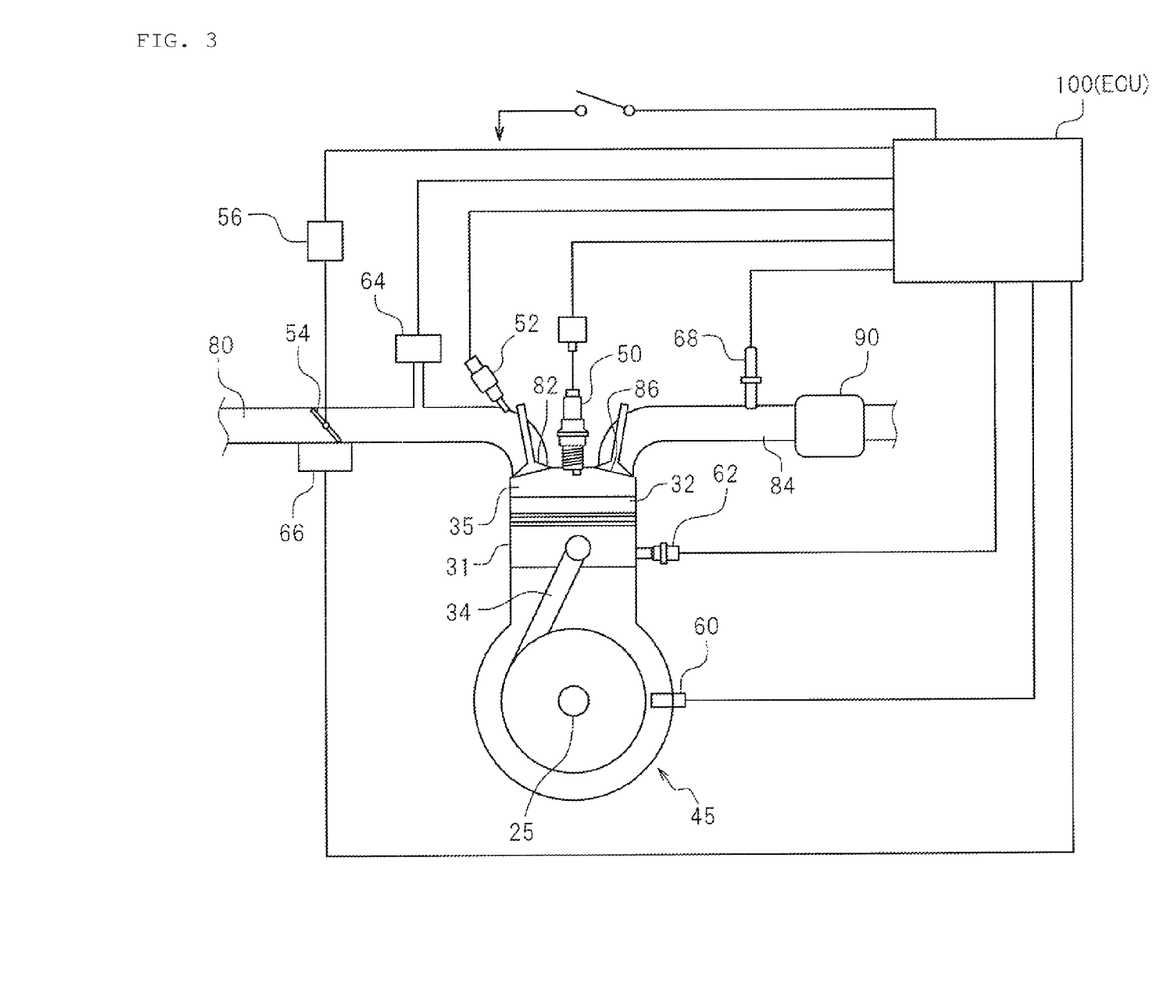
FIG. 3 is structural view of an engine according to a preferred embodiment of the present invention.

As shown in FIG. 3, the engine 45 includes a cylinder 31, a piston 32 reciprocating in the cylinder 31, a crankshaft 25, and a connection rod 34 arranged to couple the piston 32 and the crankshaft 25 to each other. The engine 45 preferably includes a fuel injection valve 52, which is a fuel injection device arranged to inject fuel, and an ignition device 50 arranged to ignite the fuel in a combustion chamber 35. The engine 45 preferably includes a crankshaft rotation speed sensor (an engine rotation speed sensor) 60 arranged to detect a rotation speed (e.g., a number of rotations per unit time) of the crankshaft 25 and a temperature sensor 62 arranged to detect a temperature of the engine 45. Hereinafter, the rotation speed of the crankshaft 25 will be referred to as the "rotation speed of the engine 45". The fuel injection valve 52 is connected to a fuel tank (not shown). The temperature sensor 62 may detect the temperature of a portion of the engine 45 (e.g., cylinder). In the case where the engine 45 is a water-cooled engine, the temperature sensor 62 may alternatively detect a temperature of the cooling water. Specifically, the temperature sensor 62 may detect the temperature of the engine 45 directly or indirectly via the cooling water or the like.

The engine 45 preferably includes an intake path 80 arranged to introduce air to the combustion chamber 35, an intake valve 82 arranged to open or close the intake path 80 and the combustion chamber 35 with respect to each other, a discharge path 84 arranged to discharge exhaust gas from the combustion chamber 35, and a discharge valve 86 arranged to open and close the combustion chamber 35 and the discharge path 84 with respect to each other. In this preferred embodiment, the fuel injection valve 52 is located so as to inject the fuel to the inside of the intake path 80. The fuel injection valve 52 may inject the fuel directly to the inside of the combustion chamber 35. Additionally, the engine 45 may include two types of fuel injection valves arranged to inject the fuel to the inside of the intake path 80 and to the inside of the combustion chamber 35, respectively.

In the intake path 80, a pressure sensor 64 is preferably provided to detect an intake pressure, which is an internal pressure of the intake path 80. In the intake path 80, a throttle valve 54 is located. The throttle valve 54 is an electronically controllable valve, a throttle opening of which is controlled by a throttle driving actuator 56. The throttle valve 54 adjusts the flow rate or the speed of air flowing in the intake path 80. The right grip 4b of the handle 4 of the motorcycle 1 preferably drives the throttle valve 54 via the throttle driving actuator 56. The right grip 4b is provided with an accelerator opening sensor (not shown) attached thereto and arranged to detect an accelerator opening, which is an operation amount of the right grip 4b, namely, an opening of the right grip 4b. The throttle valve 54 is preferably provided with a throttle position sensor 66 arranged to detect the opening of the throttle valve 54. The throttle position sensor 66 outputs a throttle opening signal to the ECU 100.

In the discharge path 84, a catalyst 90 is provided. Also in the discharge path 84, an $O_2$ sensor 68 arranged to detect oxygen contained in the exhaust gas is provided as an air-to-fuel ratio sensor. The air-to-fuel ratio sensor may be any sensor which can detect at least whether the air-to-fuel ratio is in a rich region or a lean region. The $O_2$ sensor 68 according to the present preferred embodiment can detect whether the air-to-fuel ratio is in the rich region or the lean region. An element arranged to linearly output an air-to-fuel ratio (linear A/F sensor), namely, a sensor arranged to output the air-to-fuel ratio itself may be used as the air-to-fuel ratio sensor.

As shown in FIG. 4, the crankshaft 25 is preferably coupled to a main shaft 41 via the automatic clutch 44. The main shaft 41 is preferably located parallel or substantially parallel to the crankshaft 25. The main shaft 41 is also preferably located parallel or substantially parallel to a drive shaft 42.

The automatic clutch 44 according to the present preferred embodiment preferably includes a multi-plate friction clutch 46 and a clutch actuator 70. The friction clutch 46 is located between the engine 45 and the rear wheel 23. The friction clutch 46 preferably includes a clutch housing 443 and a clutch boss 447. Inside the clutch housing 443, a plurality of friction plates 445 are provided as a driving-side rotation body. A torque of the engine 45 is conveyed to the friction plates 445. Outside the clutch boss 447, a plurality of clutch plates 449 are provided as a subordinate-side rotation body. Each of the friction plates 445 rotates together with the clutch housing 443. By contrast, each of the friction plates 445 can be moved in an axial direction of the main shaft 41. The plurality of friction plates 445 are located along the axial direction of the main shaft 41. Alternatively, the friction clutch 46 may be a single-plate clutch instead of the multi-plate clutch if so desired.

Each of the clutch plates 449 faces each of the friction plates 445 adjacent thereto. Each of the clutch plates 449 rotates together with the clutch boss 447. By contrast, each of the clutch plates 449 can be moved in the axial direction of the main shaft 41. In the present preferred embodiment, the plurality of friction plates 445 and the plurality of clutch plates 449 define a plate group 442.

As shown in FIG. 4, a pressure plate 451 is located outward to the main shaft 41 in a vehicle width direction (rightward in FIG. 4). The pressure plate 451 is generally disc-shaped. In an outer portion of the pressure plate 451 in a radial direction thereof, a press portion 451B protruding toward the plate group 442 is preferably provided. The press portion 451B is located at a position facing the friction plate 445 which is located at the rightmost position in the plate group 442.

The friction clutch 46 is provided with a spring 450. The spring 450 urges the pressure plate 451 inward in the vehicle width direction (leftward in FIG. 4). Specifically, the spring 450 urges the pressure plate 451 in a direction in which the press portion 451B presses the plate group 442.

A central portion of the pressure plate 451 is in engagement with an end portion (right end portion in FIG. 4) of a push rod 455 via a bearing 457. Thus, the pressure plate 451 is rotatable with respect to the push rod 455. The main shaft 41 preferably has a tubular shape. The other end portion (left end portion) of the push rod 455 is accommodated in the main shaft 41. In the main shaft 41, a spherical ball 459 is provided adjacent to the other end portion (left end portion) of the push rod 455. Also in the main shaft 41, a push rod 461 is provided adjacent to the ball 459.

A left end portion of the push rod 461 protrudes outward from the main shaft 41. At the left end portion of the push rod 461, a piston 463 preferably is integrally provided. The piston 463 is guided by a cylinder main body 465 to be slidable in the axial direction of the main shaft 41.

The friction clutch 46 is preferably disengaged or engaged by the clutch actuator 70. The clutch actuator 70 is preferably an electric motor in the present preferred embodiment, but is not limited thereto. Driving the clutch actuator 70 allows the friction plates 445 and the clutch plates 449 to be close to, and thus to be in contact with, each other. Driving the clutch actuator 70 also allows the friction plates 445 and the clutch plates 449 to be separated from, and thus to be distanced from, each other. In this manner, the friction clutch 46 can be disengaged or engaged.

Figure 5:
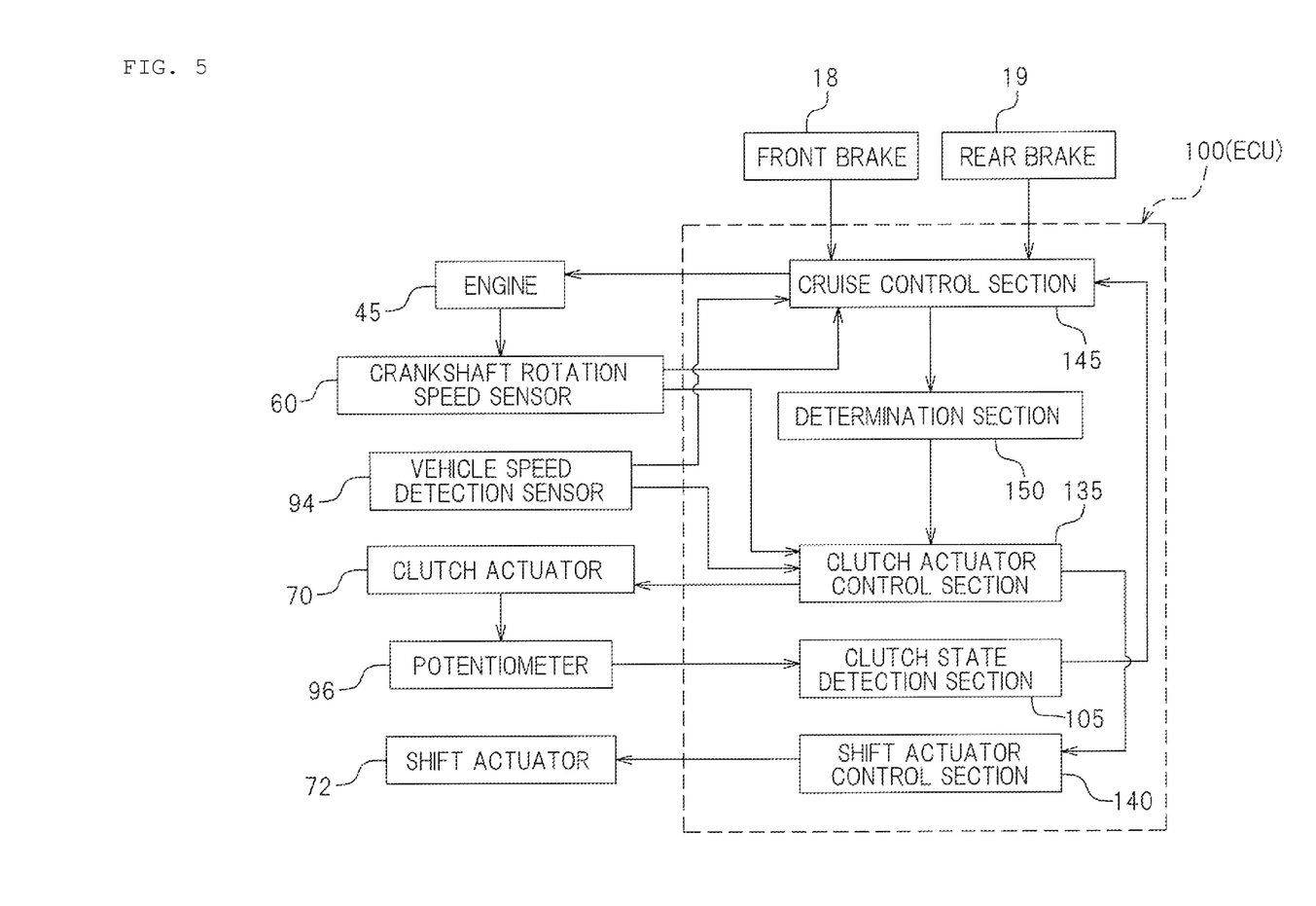
FIG. 5 is a block diagram showing a portion of the elements of a motorcycle according to a preferred embodiment of the present invention.

The clutch actuator 70 is preferably provided with a potentiometer 96 (see FIG. 5). The potentiometer 96 preferably is a clutch actuator sensor arranged to detect a driving amount of the clutch actuator 70. The potentiometer 96 detects a rotation angle or a rotation position of the clutch actuator 70. The clutch actuator 70 and the clutch actuator sensor may be integrated together if so desired. An example of such an integrated clutch actuator 70 is a servo motor which is arranged to detect a rotation angle and a rotation position.

When the clutch actuator 70 is driven, a space 467 enclosed by the piston 463 and the cylinder main body 465 is supplied with hydraulic oil. A change of the driving force of the clutch actuator 70 adjusts the oil pressure of the hydraulic oil supplied to the space 467 in the cylinder main body 465. When the space 467 is supplied with the hydraulic oil, the piston 463 is pushed and moved rightward in FIG. 4. Thus, the piston 463 pushes the pressure plate 451 rightward in FIG. 4 via the push rod 461, the ball 459, the push rod 455 and the bearing 457.

When the rightward (in FIG. 4) pushing force applied to the pressure plate 451 via the piston 463 is increased, the press portion 451B of the pressure plate 451 is separated from the friction plates 445. As a result, the friction clutch 46 is put into a disengaged state. In the state where the press portion 451B is separated from the plate group 442, each friction plate 445 and each clutch plate 449 are separated from each other, and a small gap is provided between each friction plate 445 and each clutch plate 449. Therefore, no friction force for conveying a torque is generated between each friction plate 445 and each clutch plate 449.

In order to drive the clutch actuator 70 to engage the friction clutch 46, the pressure plate 451 is moved leftward in FIG. 4 by the spring 450. When the pressure plate 451 is moved leftward in FIG. 4, the press portion 451B presses the plate group 442 leftward. As a result, the friction clutch 46 is put into a half clutch state. Specifically, each friction plate 445 and each clutch plate 449 contact each other and rotate with respect to each other. As a result, the torque of the engine 45 is conveyed to the main shaft 41 via the friction plates 445 and the clutch plates 449. The "half clutch state" of the friction clutch 46 refers to a state where a portion of the torque of the engine 45 is conveyed to the main shaft 41 via the friction clutch 46 while each friction plate 445 and each clutch plate 449 of the friction clutch 46 rotate with respect to each other. Specifically, the "half clutch state" of the friction clutch 46 refers to a state where the clutch housing 443 (friction plates 445) and the clutch boss 447 (clutch plates 449) are in contact with each other while the difference between the rotation speed of the clutch housing 443 (friction plates 445) and the rotation speed of the clutch boss 447 (clutch plates 449) (the difference will be referred to as the "clutch rotation speed difference of the friction clutch 46") is not zero.

When the pressure plate 451 is moved further leftward in FIG. 4 by the spring 450, each friction plate 445 and each clutch plate 449 of the plate group 442 are put into pressure contact with each other. As a result, the friction clutch 46 is put into an engaged state. Specifically, each friction plate 445 and each clutch plate 449 rotate integrally together.

As described above, the pressure plate 451 moves in one direction or the other direction along the axial direction of the main shaft 41 in accordance with which of the driving force of the clutch actuator 70 and the urging force of the spring 450 is larger. In accordance with such a movement, the friction clutch 46 is put into an engaged state, a half clutch state or a disengaged state.

At the crankshaft 25 of the engine 45, a gear 27 is integrally supported. At the main shaft 41, a gear 441 meshing together with the gear 27 is supported. The gear 441 is rotatable with respect to the main shaft 41. The gear 441 is preferably provided integrally with, for example, the clutch housing 443. Thus, the torque of the engine 45 is conveyed from the crankshaft 25 via the gear 441 to the clutch housing 443. The torque of the engine 45 is also conveyed from the clutch housing 443 to the clutch boss 447 by a friction force generated between the plurality of friction plates 445 and the plurality of clutch plates 449. The clutch boss 447 and the main shaft 41 integrally rotate together. Specifically, the clutch boss 447 and the main shaft 41 do not rotate with respect to each other. Therefore, when the friction clutch 46 is engaged, the torque of the engine 45 is conveyed to the main shaft 41.

The push rod 455 is not limited to a push rod arranged to push the pressure plate 451 rightward in FIG. 4 by a mechanism inserted through the main shaft 41. For example, the push rod 455 may be a push rod arranged to pull the pressure plate 451 rightward in FIG. 4 by a mechanism provided outward to the pressure plate 451 in the vehicle width direction (rightward in FIG. 4).

The transmission mechanism 43 according to this preferred embodiment is preferably a so-called dog clutch type and also is a stepped transmission mechanism. The transmission mechanism 43 is located on a power transmission path arranged to convey the torque of the engine 45 to the rear wheel 23 (see FIG. 1), between the friction plates 445 of the friction clutch 46 and the rear wheel 23. The transmission mechanism 43 preferably includes transmission gears 49 and 420, a shift cam 421, shift forks 422, a shift actuator 72 and the like described later. The transmission mechanism 43 includes a shift position sensor (not shown). The shift position sensor detects a combination of the transmission gears 49 and 420. The shift position sensor outputs a signal regarding the detected combination of the transmission gears 49 and 420 to the ECU 100.

The main shaft 41 preferably includes a plurality of transmission gears 49 attached thereto. By contrast, the drive shaft 42 includes a plurality of transmission gears 420 attached thereto corresponding to the plurality of transmission gears 49. Only a selected transmission gear 49 among the plurality of transmission gears 49 and only a selected transmission gear 420 among the plurality of transmission gears 420 are engageable with each other. At least either the transmission gears 49 among the plurality of transmission gears 49 which are not selected, or the transmission gears 420 among the plurality of transmission gears 420 which are not selected, are rotatable with respect to the main shaft 41 or the drive shaft 42. Specifically, at least either the transmission gears 49 among the plurality of transmission gears 49 which are not selected, or the transmission gears 420 among the plurality of transmission gears 420 which are not selected, idle with respect to the main shaft 41 or the drive shaft 42. The conveyance of rotation between the main shaft 41 and the drive shaft 42 is performed only via the selected transmission gear 49 and the selected transmission gear 420 which are gearing with each other.

The transmission gear 49 and the transmission gear 420 are selected by the shift cam 421. An outer circumferential surface of the shift cam 421 includes a plurality of cam grooves 421a defined therein. Each shift fork 422 is attached to each of the cam grooves 421a. Each shift fork 422 is in engagement with a prescribed transmission gear 49 and a prescribed transmission gear 420 for the main shaft 41 and the drive shaft 42. When the shift cam 421 is rotated, the plurality of shift forks 422 are respectively guided by the cam grooves 421a to move in the axial direction of the main shaft 41. In this manner, the transmission gear 49 and the transmission gear 420 which are to be engaged with each other are selected from the transmission gears 49 and the transmission gears 420. Specifically, only a pair of transmission gears, among the plurality of transmission gears 49 and transmission gears 420, which are at positions corresponding to the rotation angle of the shift cam 421 are respectively put into a secured state by a spline with respect to the main shaft 41 and the drive shaft 42. Thus, a gear position in the transmission mechanism 43 is determined. As a result, the conveyance of rotation is performed between the main shaft 41 and the drive shaft 42 at a prescribed gear ratio via the transmission gear 49 and the transmission gear 420. The shift cam 421 is rotated by a prescribed angle by a reciprocating movement of a shift rod 75.

Switching of the transmission gears 49 and 420 in the transmission mechanism 43, namely, the change of the gear position of the transmission mechanism 43 is performed by driving of the shift actuator 72. The shift actuator 72 is preferably an electric motor in the present preferred embodiment, but is not limited thereto. The shift actuator 72 is connected to the shift cam 421 via the shift rod 75. The shift rod 75 is reciprocated by the driving of the shift actuator 72. After the friction clutch 46 starts to be disengaged by the clutch actuator 70, the shift actuator 72 moves the shift rod 75 and thus switches the transmission gears of the transmission mechanism 43. The shift actuator 72 preferably is provided with a potentiometer (not shown). The potentiometer is a shift actuator sensor arranged to detect a driving amount of the shift actuator 72. The potentiometer detects a rotation angle or a rotation position of the shift actuator 72. The shift actuator 72 and the shift actuator sensor may be integrated together. An example of such an integrated shift actuator 72 is a servo motor arranged to detect a rotation angle and a rotation position.

As a result of the above-described structure, when a prescribed pair of transmission gears 49 and 420 are respectively secured to the main shaft 41 and the drive shaft 42 and the friction clutch 46 is put into a half clutch state or an engaged state while the engine 45 is driven, the torque of the engine 45 is conveyed to the main shaft 41 via the friction clutch 46. The conveyance of rotation is performed between the main shaft 41 and the drive shaft 42 at a prescribed gear ratio via the prescribed pair of transmission gears 49 and 420, and thus the drive shaft 42 is rotated. When the drive shaft 42 is rotated, the torque is conveyed by a power conveyance mechanism 47 (see FIG. 1) arranged to connect the drive shaft 42 and the rear wheel 23 (see FIG. 1) to each other, and thus the rear wheel 23 is rotated. The transmission mechanism 43 is not limited to a stepped transmission mechanism and may instead be, for example, a continuously variable transmission mechanism such as a V-belt continuously variable transmission.

The motorcycle 1 includes the ECU (Electric Control Unit) 100 as a control device arranged and programmed to control the engine 45. As shown in FIG. 5, the ECU 100 preferably includes a clutch state detection section 105, a clutch actuator control section 135, the shift actuator control section 140, a cruise control section 145, and a determination section 150.

The clutch state detection section 105 is arranged to detect a half clutch state of the friction clutch 46 based on the rotation angle or the rotation position of the clutch actuator 70 which is detected by the potentiometer 96. For example, when the rotation angle of the clutch actuator 70 is equal to or smaller than a prescribed rotation angle θ1, the friction clutch 46 is detected as being in an engaged state. When the rotation angle of the clutch actuator 70 is equal to or larger than a prescribed rotation angle θ2, the friction clutch 46 is detected as being in a disengaged state. When the rotation angle of the clutch actuator 70 is larger than θ1 and smaller than θ2, the friction clutch 46 is detected as being in a half clutch state. In the case where a servo motor arranged to detect the rotation angle and the rotation position is used as the clutch actuator 70, the clutch state detection section 105 can detect the state of the friction clutch 46 based on the rotation angle or the rotation position detected by the servo motor.

The cruise control section 145 performs control to maintain the vehicle speed of the motorcycle 1 at a prescribed vehicle speed (i.e., "cruise control") by controlling the output of the engine while the friction clutch 46 is engaged. The prescribed vehicle speed can be freely set by the rider. The prescribed vehicle speed may be, for example, set to the vehicle speed at the time when the rider pushed a set button of the cruise control. The cruise control section 145 stores the prescribed vehicle speed set by the rider. When the friction clutch 46 is disengaged while the cruise control section 145 performs the cruise control, the cruise control section 145 cancels the cruise control. When the rear brake 19 or the front brake 18 is actuated to apply a braking power to the rear wheel 23 or the front wheel 12 while the cruise control section 145 performs the cruise control, the cruise control section 145 cancels the cruise control. The cruise control may be turned on or off manually by an operation of the set button (not shown).

The cruise control section 145 is arranged and programmed to control the ignition device 50 by giving, for example, a pulse signal thereto. The cruise control section 145 is arranged and programmed to control the fuel injection valve 52 by giving, for example, a pulse signal thereto. The cruise control section 145 is arranged and programmed to control the opening of the throttle valve 52 by driving the throttle driving actuator 56 based on information received from the accelerator opening sensor. The cruise control section 145 is arranged and programmed to execute at least one of the control on the ignition device 50, the control on the fuel injection valve 52, and the control on the opening of the throttle valve 54, and thus controls the output of the engine 45. Even when the rotation speed of the engine 45 or the vehicle speed is temporarily decreased by an external factor such as, for example, the motorcycle 1 going over a step or a bump, the cruise control section 145 can control the output of the engine 45 to automatically increase the vehicle speed and thus to keep the vehicle speed at a prescribed vehicle speed.

The determination section 150 is arranged to determine whether the cruise control section 145 is performing the cruise control or not.

The clutch actuation control section 135 controls the clutch actuator 70. The clutch actuator 70 can be driven based on the control of the clutch actuator control section 135. In the case where the determination section 150 determines that the cruise control section 145 is not performing the cruise control, the clutch actuation control section 135 performs control to drive the clutch actuator 70 to disengage the friction clutch 46 when the value of a parameter, which is either the rotation speed of the engine 45 detected by the crankshaft rotation speed sensor 60 or the vehicle speed of the motorcycle 1 detected by the vehicle speed detection sensor 94, becomes equal to or lower than a first threshold value. In the case where the determination section 150 determines that the cruise control section 145 is performing the cruise control, the clutch actuation control section 135 performs control to drive the clutch actuator 70 to disengage the friction clutch 46 when the value of the parameter becomes equal to or lower than a second threshold value, which is lower than the first threshold value. The second threshold value can be set to a value around which engine stall does not occur.

In the case where the parameter is the vehicle speed detected by the vehicle speed detection sensor 94, the first threshold value and the second threshold value may be each set to a uniform value for a plurality of transmission gear positions, or may be each set for each of the plurality of transmission gear positions. Even when the rotation speed of the engine 45 is the same, as the transmission gear position becomes higher, the gear ratio (deceleration ratio) of the transmission mechanism 43 is decreased, and the vehicle speed is increased. Thus, the first threshold value and the second threshold value may be set to a higher value as the transmission gear position becomes higher. In the case where the first threshold value and the second threshold value are each set to a uniform value for the plurality of transmission gear positions, the first threshold value and the second threshold value for the lowest gear position (first gear) may be used as the first threshold value and the second threshold value for the other transmission gear positions.

In the case where the parameter is the rotation speed of the engine 45 detected by the crankshaft rotation speed sensor 60, an idle rotation speed when the engine 45 is in an idling state can be set as the first threshold value. The "idle rotation speed" refers to the rotation speed of the engine 45 in a load-free state when the motorcycle 1 is at a stop. The idle rotation speed encompasses a first idle rotation speed when the temperature of the engine 45 is equal to or higher than a prescribed temperature, namely, the rotation speed of the engine 45 during warm-up idling, and a second idle rotation speed when the temperature of the engine 45 is lower than the prescribed temperature, namely, the rotation speed of the engine 45 during cool-down idling. The second idle rotation speed is higher than the first idle rotation speed. The first threshold value may be set to the first idle rotation speed or the second idle rotation speed.

The shift actuator control section 140 controls the shift actuator 72. The shift actuator 72 can be driven based on the control by the shift actuator control section 140. The shift actuator control section 140 drives the shift actuator 72 based on a gear change instruction from the rider. After the friction clutch 46 starts to be disengaged by the clutch actuator 70, the shift actuator control section 140 drives the transmission mechanism 43 by use of the shift actuator 72.

The motorcycle 1 according to the present preferred embodiment preferably includes at least a cruise control device, a clutch state detection device, a clutch actuator control device, a determination device, and a braking device. The cruise control device preferably includes at least the cruise control section 145. The clutch state detection device includes at least the potentiometer 96 and the clutch state detection section 105. The clutch actuator control device preferably includes at least the clutch actuator control section 135 and the clutch actuator 70. The determination device preferably includes at least the determination section 150. The braking device preferably includes at least the front brake 18 and the rear brake 19.

Figure 6:
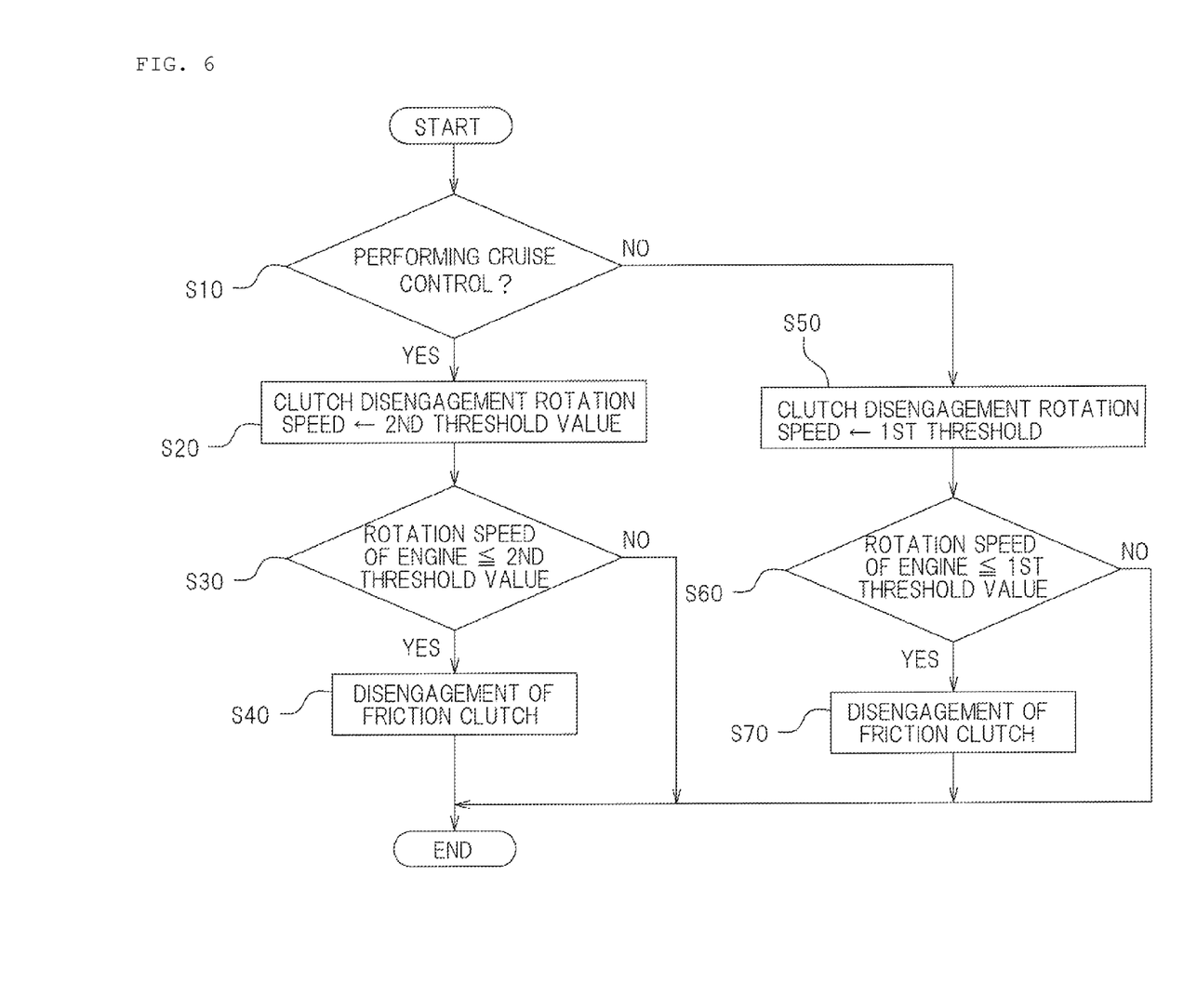
FIG. 6 is a flowchart showing cruise control of a motorcycle according to a preferred embodiment of the present invention.

Now, with reference to a flowchart in FIG. 6, the cruise control of the motorcycle 1 according to the present preferred embodiment will be described. The parameter used to disengage the friction clutch 46 is the rotation speed of the engine 45 detected by the crankshaft rotation speed sensor 60 in the present preferred embodiment, but is not limited to this. For example, the parameter used to disengage the friction clutch 46 may alternatively be the vehicle speed of the motorcycle 1 detected by the vehicle speed detection sensor 94.

First, in step S10, the determination section 150 determines whether the cruise control section 145 is performing the cruise control or not. When the cruise control section 145 is performing the cruise control, the control advances to step S20. By contrast, when the cruise control section 145 is not performing the cruise control, the control advances to step S50.

Step S20 is performed when the cruise control section 145 is performing the cruise control. In step S20, the clutch actuator control section 135 sets the parameter used to disengage the friction clutch 46 to the second threshold value, which is lower than the first threshold value.

In step S30, the clutch actuator control section 135 determines whether the rotation speed of the engine 45 is no more than the second threshold value or not. When the rotation speed of the engine 45 is no more than the second threshold value, the control advances to step S40. By contrast, when the rotation speed of the engine 45 is higher than the second threshold value, the control shown in FIG. 6 is finished. As a result, while the cruise control is performed, the friction clutch 46 is more unlikely to be disengaged. Therefore, the cruise control can be prevented from being cancelled against the intention of the rider.

In step S40, the rotation speed of the engine 45 is no more than the second threshold value. Therefore, the clutch actuator control section 135 performs the control to drive the clutch actuator 70 to disengage the friction clutch 46. As a result, engine stall can be prevented.

When the cruise control section 145 is not performing the cruise control in step S10, the control advances to step S50. In step S50, the clutch actuator control section 135 sets the value of the parameter used to disengage the friction clutch 45 to the first threshold value.

In step S60, the clutch actuator control section 135 determines whether the rotation speed of the engine 45 is no more than the first threshold value or not. When the rotation speed of the engine 45 is no more than the first threshold value, the control advances to step S70. By contrast, when the rotation speed of the engine 45 is higher than the first threshold value, the control shown in FIG. 6 is finished.

In step S70, the rotation speed of the engine 45 is no more than the first threshold value. Therefore, the clutch actuator control section 135 performs the control to driving the clutch actuator 70 to disengage the friction clutch 46. As a result, the comfort of riding can be guaranteed.

Now, with reference to a timing diagram in FIG. 7, the cruise control of the motorcycle 1 according to the present preferred embodiment will be described. The parameter used to disengage the friction clutch 46 is the rotation speed of the engine 45 detected by the crankshaft rotation speed sensor 60 in the present preferred embodiment, but is not limited to this. For example, the parameter used to disengage the friction clutch 46 may alternatively be the vehicle speed of the motorcycle 1 detected by the vehicle speed detection sensor 94, for example.

Figure 7:
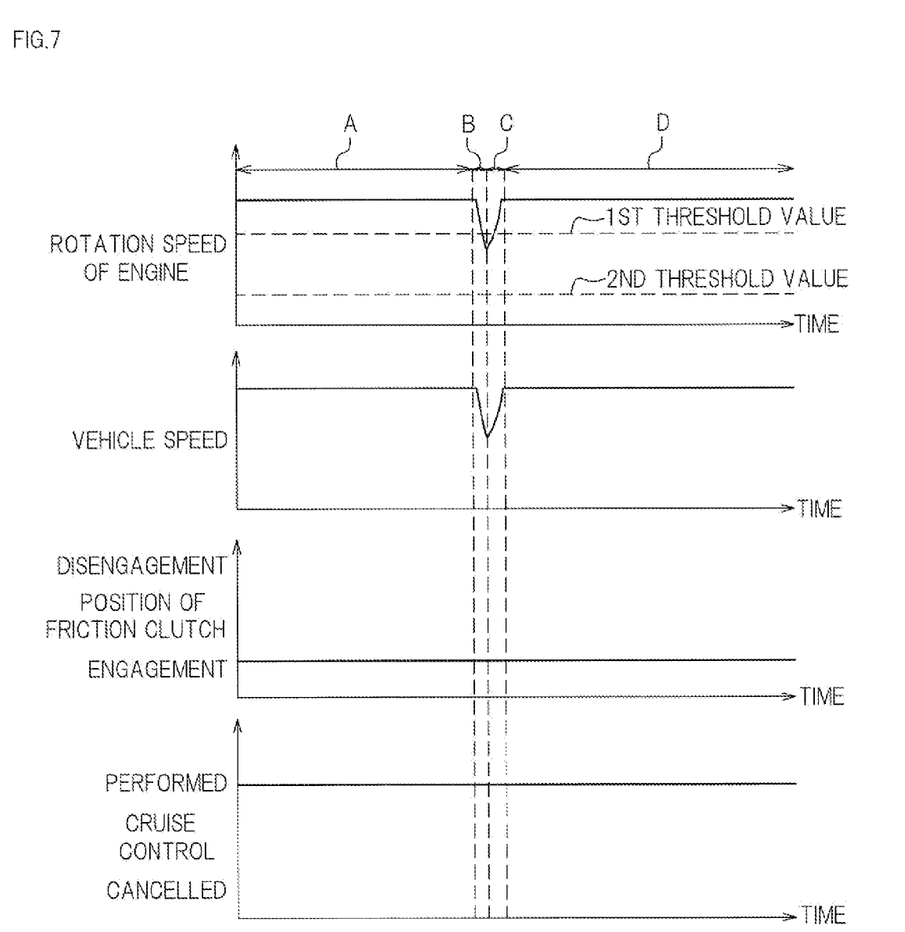
FIG. 7 is a timing diagram regarding the cruise control of a motorcycle according to a preferred embodiment of the present invention.

First, in an area of reference character A in FIG. 7, the cruise control section 145 is performing the cruise control in the motorcycle 1. Specifically, the friction clutch 46 is in an engaged state, and the cruise control section 145 is performing the control to maintain the vehicle speed of the motorcycle 1 at a prescribed vehicle speed set by the rider by controlling the output of the engine 45.

In an area of reference character B in FIG. 7, the vehicle speed is decreased as a result of the motorcycle 1 going over a step or a bump. At this point, since the friction clutch 46 is in an engaged state, the rotation speed of the engine 45 is decreased as the vehicle speed is decreased. The rotation speed of the engine 45 is decreased to a value which is equal to or lower than the first threshold value used to disengage the friction clutch 46 while the cruise control is not performed by the cruise control section 145 and is higher than the second threshold value used to disengage the friction clutch 46 while the cruise control is performed by the cruise control section 145. However, since the cruise control is performed by the cruise control section 145, the friction clutch 46 is not disengaged.

In an area of reference character C in FIG. 7, the rotation speed of the engine 45 does not become equal to or lower than the second threshold value, and thus the friction clutch 46 is not disengaged. Therefore, after the vehicle speed is temporarily decreased as a result of the motorcycle 1 going over the step, the cruise control section 145 controls the output of the engine 45 to automatically increase the vehicle speed.

In an area of reference character D in FIG. 7, as a result of the cruise control section 145 controlling the output of the engine 45 to automatically increase the vehicle speed, the vehicle speed is returned to the prescribed vehicle speed.

After this, the cruise control section 145 performs the control to maintain the vehicle speed at the prescribed vehicle speed by controlling the output of the engine 45.

As described above, with the motorcycle 1 according to a preferred embodiment of the present invention, while the control to maintain the vehicle speed at a prescribed vehicle speed (i.e., "cruise control") is not performed by the cruise control section 145, the clutch actuator control section 135 performs the following control so that the comfort of riding is assured. When the value of the parameter, which is either the rotation speed of the engine 45 or the vehicle speed, is decreased to a value equal to or lower than the first threshold value, the clutch actuator control section 135 performs the control to disengage the friction clutch 46. As a result, the comfort of riding can be guaranteed. By contrast, while the cruise control section 145 performs the cruise control, when the value of the parameter, which is either the rotation speed of the engine 45 or the vehicle speed, is decreased to a value equal to or lower than the second threshold value, which is lower than the first threshold value, the clutch actuator control section 135 performs the control to disengage the friction clutch 46. As a result, while the cruise control is performed, the friction clutch 46 is more unlikely to be disengaged. Therefore, the cruise control can be prevented from being cancelled against the intention of the rider. This is especially effective for the case where the rotation speed of the engine 45 or the vehicle speed is decreased merely temporarily as a result of an external factor such as such as, for example, the motorcycle 1 going over a step or a bump. When the rotation speed of the engine 45 or the vehicle speed is decreased as a result of an external factor such as such as, for example, the motorcycle 1 going over a step or a bump, the decrease is temporary and thus the comfort for the rider is not spoiled. In addition, the cruise control returns the vehicle speed, if being decreased, to the prescribed vehicle speed automatically. Therefore, engine stall is unlikely to occur. For this reason, while the cruise control is performed, a decrease of the second threshold value does not cause any practical problem. If the second threshold value is decreased uniformly regardless of whether the cruise control section 145 is performing the cruise control or not, the following occurs. While the cruise control is not performed, the friction clutch 46 is not disengaged until the rotation speed of the engine 45 or the vehicle speed is decreased significantly. This causes a problem that the comfort of riding is spoiled. However, the motorcycle 1 according to a preferred embodiment of the present invention can avoid such a problem. As seen from the above, the motorcycle 1 according to preferred embodiments of the present invention can prevent the cruise control from being cancelled against the intention of the rider while the cruise control is performed and also can guarantee the comfort of riding.

The motorcycle 1 according to a preferred embodiment of the present invention preferably includes the transmission mechanism 43 including a plurality of transmission gear positions. The transmission mechanism 43 preferably includes, for example, the first transmission gear through the sixth transmission gear. In the case where the vehicle speed is adopted as the parameter, it is preferable that the first threshold value and the second threshold value are each set for each of the plurality of transmission gear positions. In the case where the vehicle speed used to disengage the friction clutch 46 is set for each of the transmission gear positions, the cancellation of the cruise control against the intention of the rider can be prevented more preferably than in the case where the first threshold value and the second threshold value of the vehicle speed are set uniformly for all the gear positions.

The motorcycle 1 according to a preferred embodiment of the present invention preferably includes the shift actuator 72 arranged to drive the transmission mechanism 43. As a result, even when the vehicle speed is temporarily decreased by an external factor such as, for example, the motorcycle 1 going over a step or a bump, the gear position of the transmission mechanism 43 can be automatically changed to return the vehicle speed to a prescribed vehicle speed swiftly.

According to the present preferred embodiment, the parameter is the rotation speed of the engine 45, and the first threshold value is set to the idle rotation speed when the engine 45 is in an idling state. As a result, the comfort of riding can be guaranteed.

According to a preferred embodiment of the present invention, the idle rotation speed encompasses the first idle rotation speed when the temperature of the engine 45 is equal to or higher than a prescribed temperature, and the second idle rotation speed when the temperature of the engine 45 is lower than the prescribed temperature. The second idle rotation speed is higher than the first idle rotation speed, and the first threshold value is set to the second idle rotation speed. When the temperature of the engine 45 is lower than the prescribed temperature, the engine 45, when being in an idling state, is driven at the second idle rotation speed, which is relatively high. Therefore, the engine 45 can be warmed up quickly. In the meantime, the first threshold value is set to a higher value, and thus the problem that the cruise control is cancelled against the intention of the rider is more likely to occur. For this reason, the above-described effect is exerted more effectively.

The motorcycle 1 according to a preferred embodiment of the present invention preferably includes the rear brake 19 arranged to apply a braking power to the rear wheel 23. When the rear brake 19 applies a braking power to the rear wheel 23 while the cruise control section 145 performs the control to maintain the vehicle speed at a prescribed vehicle speed, the cruise control section 145 cancels the control to maintain the vehicle speed at a prescribed vehicle speed. In this manner, the rider can easily cancel the control to maintain the vehicle speed at a prescribed vehicle speed by actuating the rear brake 19.

The vehicle according to the preferred embodiments of the present invention is not limited to a vehicle arranged to execute semi-automatic control to automatically perform the gear change based on an intention of the rider, and may be a vehicle arranged to execute full-automatic control to automatically perform the gear change in accordance with the driving state of the vehicle, regardless of the intention of the rider. Instead of the clutch actuator 70 and the shift actuator 72 being provided separately, a single actuator arranged to drive the friction clutch 46 and the transmission mechanism 43 may be provided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
    an engine;
    a driving wheel arranged to be driven by the engine;
    a clutch located between the engine and the driving wheel;
    a clutch actuator arranged to disengage and engage the clutch;
    an engine rotation speed sensor arranged to detect a rotation speed of the engine;
    a vehicle speed detection sensor arranged to detect a vehicle speed;
    a clutch actuator control device arranged and programmed to control the clutch actuator;
    a cruise control device arranged and programmed to perform control to maintain the vehicle speed at a prescribed vehicle speed by controlling an output of the engine while the clutch is engaged, and to cancel the control to maintain the vehicle speed at a prescribed vehicle speed when the clutch is disengaged; and
    a determination device arranged to determine whether the cruise control device is performing the control to maintain the vehicle speed at the prescribed vehicle speed; wherein
    when the cruise control device is determined to not be performing the control to maintain the vehicle speed at a prescribed vehicle speed, the clutch actuator control device performs control to disengage the clutch when a value of a parameter, which is either the rotation speed of the engine or the vehicle speed, becomes equal to or lower than a first threshold value; and
    when the cruise control device is determined to be performing the control to maintain the vehicle speed at a prescribed vehicle speed, the clutch actuator control device performs the control to disengage the clutch when the value of the parameter becomes equal to or lower than a second threshold value, which is lower than the first threshold value.

2. The vehicle according to claim 1, further comprising a transmission mechanism including a plurality of transmission gear positions; wherein
    the parameter is the vehicle speed; and
    the first threshold value and the second threshold value are each set for each of the plurality of transmission gear positions.

3. The vehicle according to claim 2, further comprising a shift actuator arranged to drive the transmission mechanism.

4. The vehicle according to claim 1, wherein the parameter is the rotation speed of the engine, and the first threshold value is set to an idle rotation speed when the engine is in an idling state.

5. The vehicle according to claim 4, wherein:
    the idle rotation speed encompasses a first idle rotation speed when the engine has a temperature equal to or higher than a prescribed temperature and a second idle rotation speed when the engine has a temperature lower than the prescribed temperature;
    the second idle rotation speed is higher than the first idle rotation speed; and
    the first threshold value is set to the second idle rotation speed.

6. The vehicle according to claim 1, further comprising a braking device arranged to apply a braking power to the driving wheel; wherein
    when the braking device applies a braking power to the driving wheel while the cruise control device performs the control to maintain the vehicle speed at a prescribed vehicle speed, the cruise control device cancels the control to maintain the vehicle speed at the prescribed vehicle speed.

7. The vehicle according to claim 1, wherein the vehicle is a motorcycle.

* * * * *